United States Patent [19]

Ohtsuka et al.

[11] Patent Number: 4,870,680
[45] Date of Patent: Sep. 26, 1989

[54] COMMUNICATION APPARATUS HAVING A COMMUNICATION HOLD FUNCTION

[75] Inventors: Kuniaki Ohtsuka, Yokohama; Shigeru Nishikawa, Tokyo, both of Japan

[73] Assignee: Canon Kabushiki Kaisha, Tokyo, Japan

[21] Appl. No.: 134,806

[22] Filed: Dec. 18, 1987

[30] Foreign Application Priority Data

Dec. 23, 1986 [JP]   Japan .................................. 61-306864

[51] Int. Cl.⁴ .............................................. H04M 1/72
[52] U.S. Cl. ...................................... 379/163; 379/393
[58] Field of Search ............... 379/162, 393, 163, 210, 379/212

[56] References Cited

U.S. PATENT DOCUMENTS

| | | | |
|---|---|---|---|
| 3,961,142 | 6/1976 | Caffine | 379/162 |
| 4,731,822 | 3/1988 | Berry et al. | 379/163 |

*Primary Examiner*—Stafford D. Schreyer
*Attorney, Agent, or Firm*—Fitzpatrick, CElla, Harper & Scinto

[57] ABSTRACT

A communication apparatus such as a telephone set has a hold circuit for putting a telephone call from a communication partner on hold, a release circuit for releasing the telephone call from the on-hold condition, a circuit for informing the communication partner when the telephone call is released and a detect circuit for detecting when the communication partner whose telephone call is on hold breaks the line, e.g. by hanging up. The communication partner is informed of the release of the on-hold condition in accordance with such release and the detection of line break by the detect circuit.

9 Claims, 8 Drawing Sheets

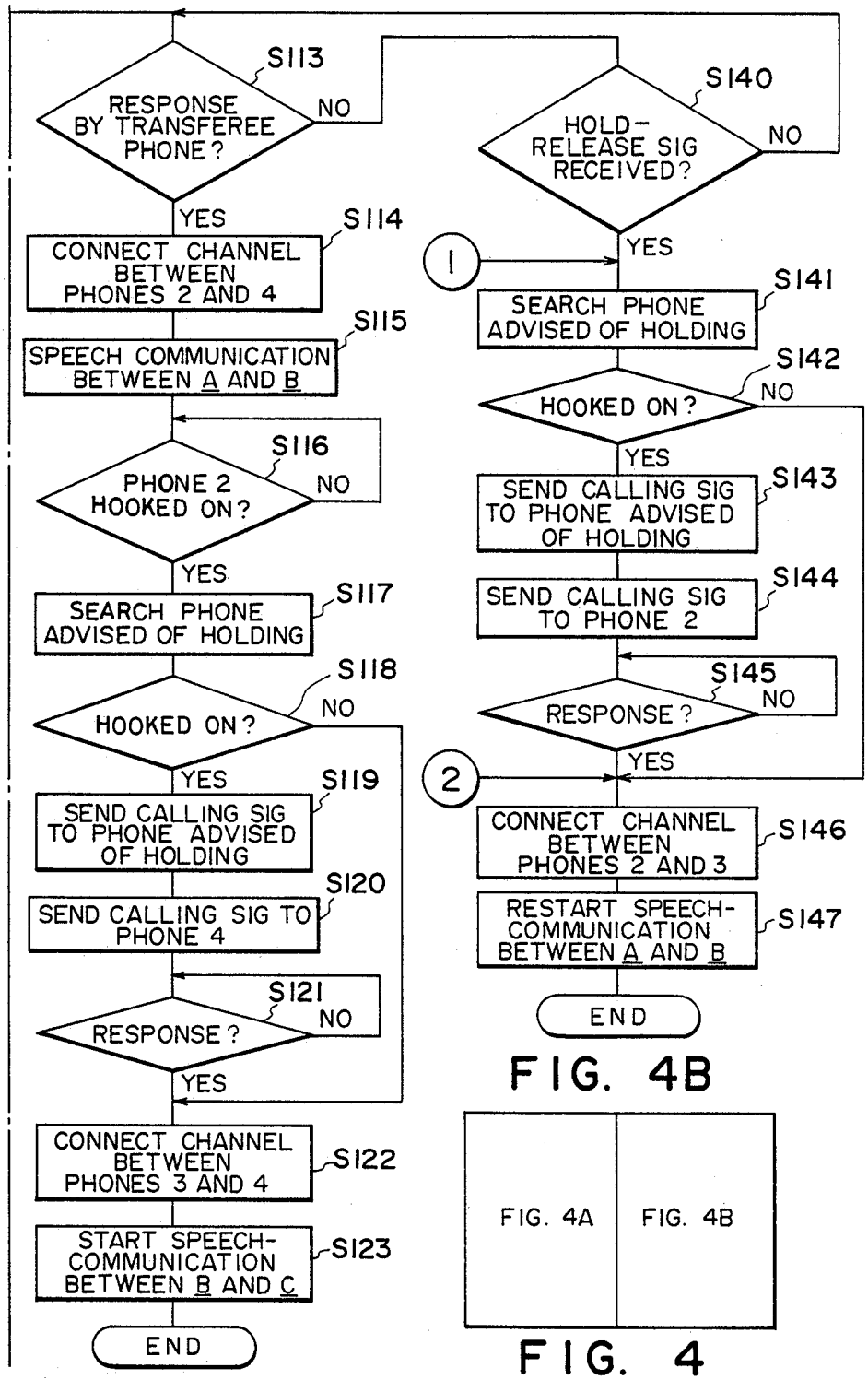

COMMUNICATION APPARATUS HAVING A COMMUNICATION HOLD FUNCTION

BACKGROUND OF THE INVENTION

1. Field of the Invention

The present invention relates to a communication apparatus having a communication hold function.

2. Related Background Art

In holding communication in a prior art system, a holding telephone set or a private switcher or button telephone system sends a holding tone to a held telephone set to inform the recipient operator of a hold state. The recipient operator at the held telephone set listens to the holding tone while he/she puts a handset to his/her ear, and he/she can know when the hold state is released by the extinguishment of the holding tone, or by hearing a voice of an operator at the holding telephone set. The operator at the held telephone set does not know when the holding will be released and he/she has to wait while he/she holds the handset.

SUMMARY OF THE INVENTION

It is an object of the present invention to improve a communication apparatus.

It is another object of the present invention to solve the problems described above.

It is a further object of the present invention to make the release of communication holding more readily distinguishable.

It is still another object of the present invention to enable an operator at a hold station to readily recognize the release of communication holding.

It is still a further object of the present invention to monitor the release of holding by a communication control unit and to inform the release of holding to a held station when the release of holding is detected.

Other objects of the present invention will be apparent from the following description of the invention.

BRIEF DESCRIPTION OF THE DRAWINGS

FIGS. 4A and 4B show a flow chart of the second embodiment,

DETAILED DESCRIPTION OF THE PREFERRED EMBODIMENTS

Figure 1:
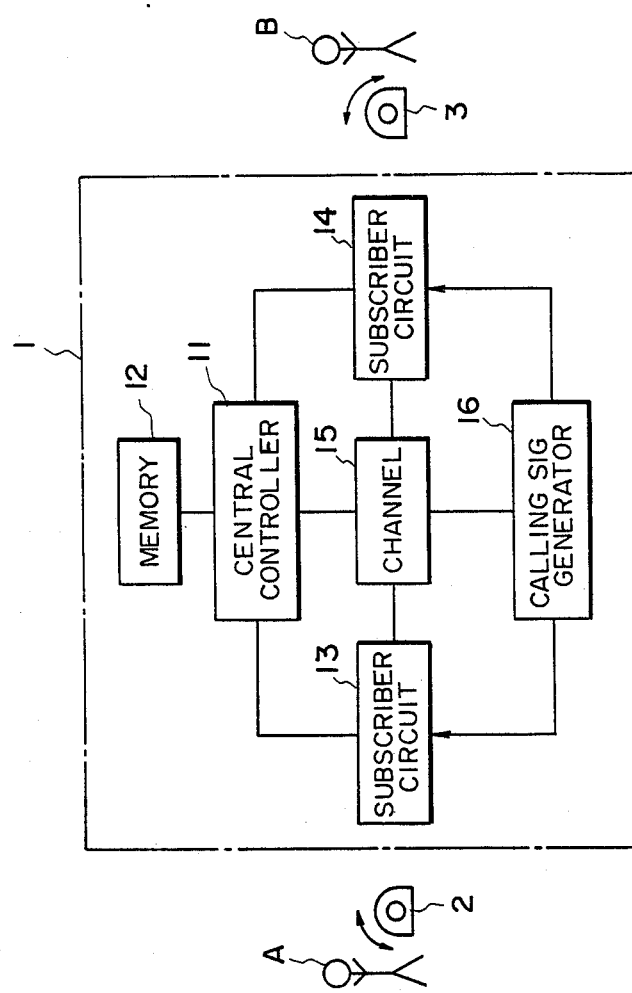
FIG. 1 shows a block diagram of a first embodiment of the present invention.
Figure 3:
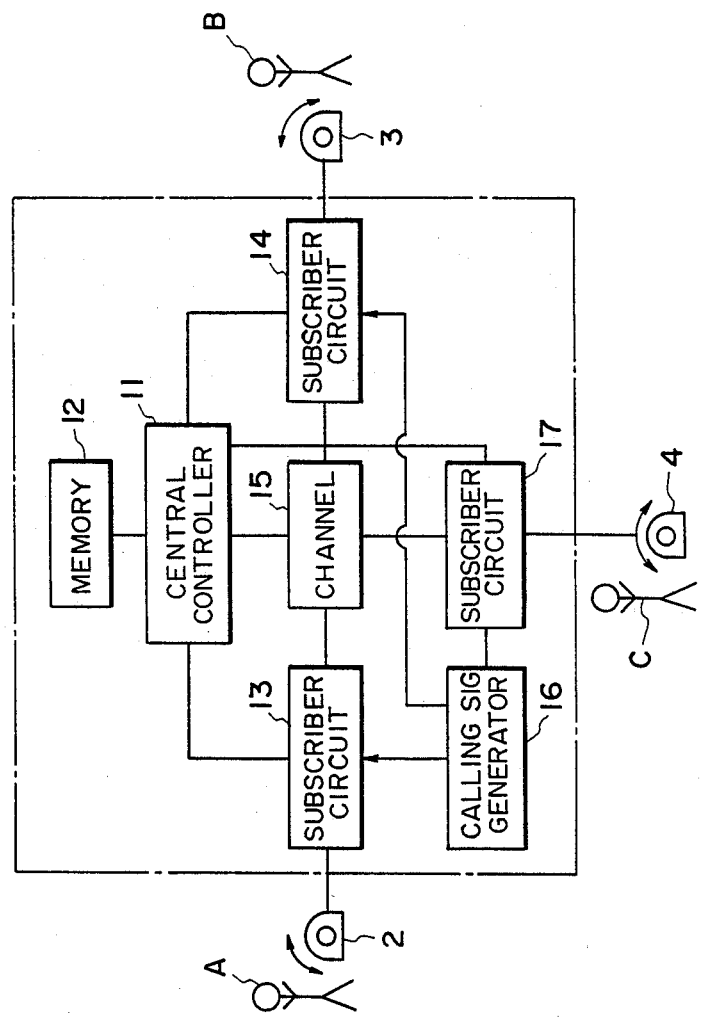
FIG. 3 shows a block diagram of first and second embodiments.

FIGS. 1 and 3 show configurations of a telephone system in accordance with a first embodiment of the present invention.

Numeral 1 denotes a private switcher, numeral 11 denotes a central control unit (which comprises a microcomputer, a ROM and a RAM), numeral 12 denotes a memory for storing subscriber information and others, numerals 13, 14 and 17 (FIG. 3) denote subscriber circuits each having a function for monitoring a subscriber status, and for supplying a current to a subscriber telephone set, and numeral 16 denotes a circuit for generating a calling signal for ringing a bell of the subscriber telephone set. Numerals 2, 3 and 4 (FIG. 3) denote subscriber telephone sets. An operator who uses the subscriber telephone set 2 is designated by A, an operator who uses the subscriber telephone set 3 is designated by B, and an operator who uses the subscriber telephone set 4 is designated by C.

Figure 2:
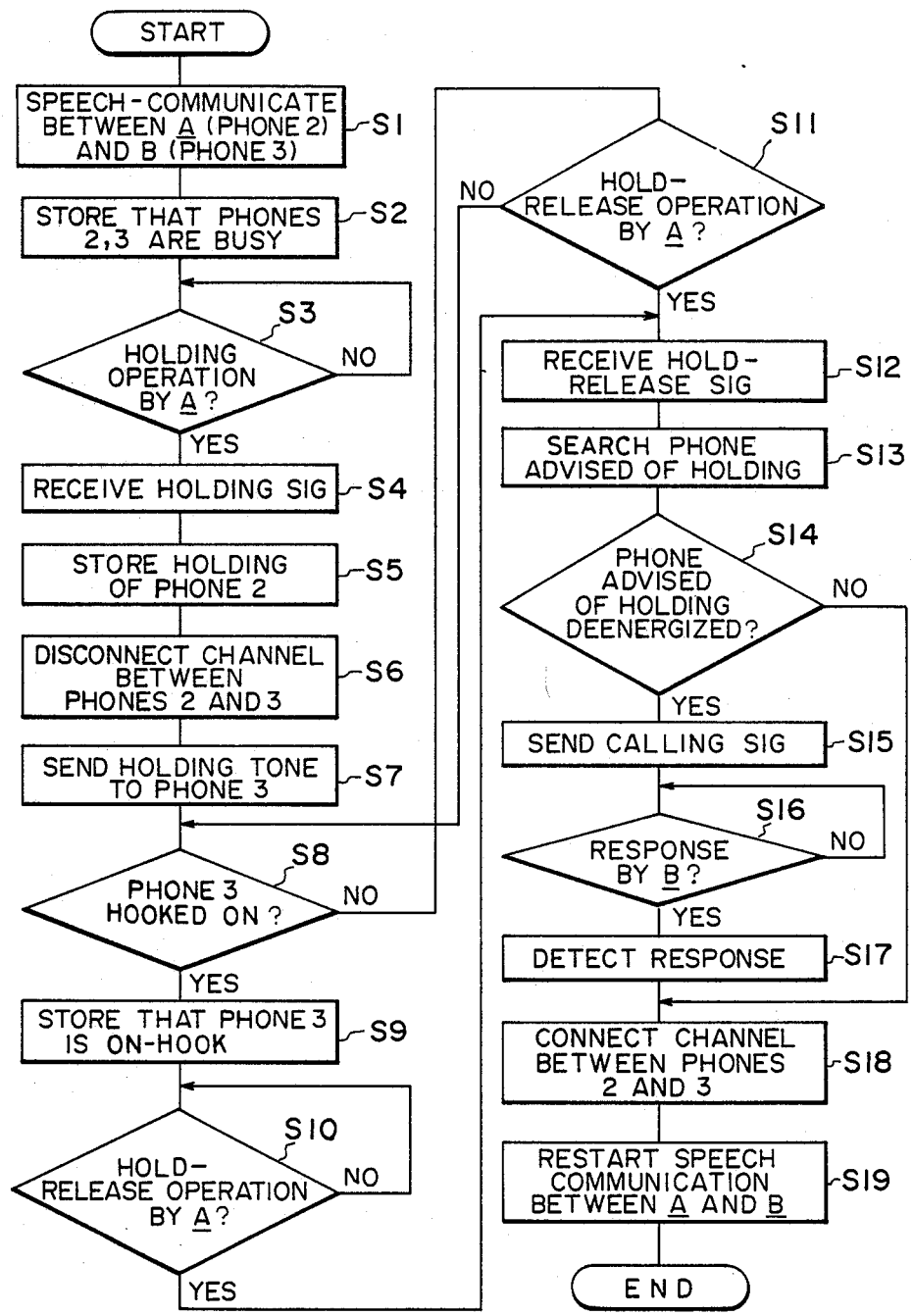
FIG. 2 shows a flow chart of the first embodiment.

FIG. 2 shows a flow chart of a control operation of the central control unit 11 of the first embodiment.

The operation of the first embodiment is now explained with reference to the flow chart of FIG. 2. A program for the operation of the flow chart of FIG. 2 is stored in the ROM of the central control unit 11.

Let us assume that A and B are communicating with each other through the telephone sets 2 and 3 (step S1). If A now holds the communication through the telephone set 2 (step S3), the telephone set 2 sends a signal to a private switcher or a button telephone main control unit 1 indicating an intention to hold the speech communication (step S4). When the private switcher or button telephone main control unit 1 receives the holding signal, it temporarily disconnects a communication line between the telephone sets 2 and 3 (step S6). The private switcher or button telephone main control unit 1 sends an audible sound (called the holding tone) to the telephone set 3 to indicate the holding of the speech. Then B has to wait until the holding is released without hooking on, i.e. hanging up or breaking the line, the handset, according to the prior art system. In accordance with the present invention, B may hook on the handset (step S8). In this case, the private switcher or button telephone main control unit 1 stores the information that the telephone sets 2 and 3 were in communication, that the holding signal was received from the telephone set 2 and that the telephone set 3 was hooked on during the hold state (steps S2, S5 and S9).

When the private switcher or button telephone main control unit 1 detects that A has effected an operation of holding release to the telephone set 2 after the hook-on of the telephone set 3 (step S10) or before the hook-on of the telephone set 3 (step S11), it receives a signal indicating an intention of releasing the holding from the telephone set 2 (step S12). The private switcher or button telephone main control unit 1 searches the held telephone set (telephone set 3 in the present embodiment) by referencing the stored information (step S13), and if it detects that the hold telephone set has been hooked on (step S14), it sends a calling signal to the telephone set 3 (step S15). When B, who is waiting for the release with the telephone set 3 being hooked on receives the calling signal, he/she hooks off (lifts up) the handset (step S16), and the private switcher or button telephone main control unit 1 detects the off-hook (step S17) and connects a communication line between the telephone sets 2 and 3 (step S18). On the other hand, if the telephone set 3 has not been hooked on (step S14), the communication line between the telephone sets 2 and 3 is immediately connected (step S18) and A and B can resume the speech.

Until B hooks off the handset after the calling signal has been sent to the on-hook held telephone set (telephone set 3) (step S15), an audible sound (calling a tone) may be sent to the hold-releasing telephone set (telephone set 2) so that A can recognize that B has hooked on the handset.

The first embodiment described above may respond not only to the holding but also to other functions of the telephone switcher. A transfer is one of examples FIG. 4 shows a flow chart of transfer control.

In FIG. 3, another subscriber circuit 17 and another telephone set 4 are added to the configuration of FIG. 1. Additional telephone sets may be arranged to the button telephone main control unit 1.

Figure 4A:
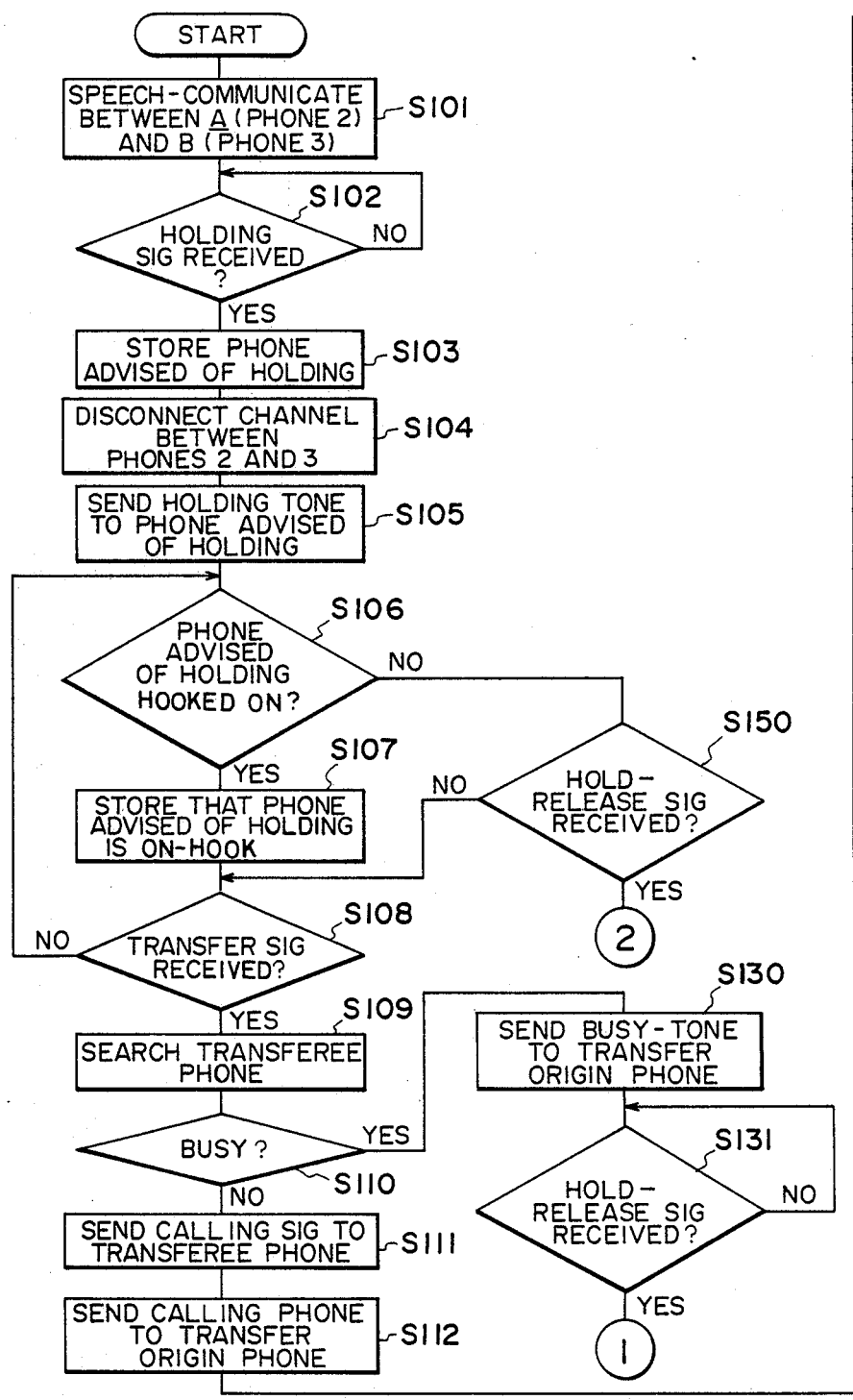

Explanation is made with reference to the flow chart of FIG. 4.

Let us assume that A and B are talking through the telephone sets 2 and 3 in FIG. 3 (step S101). If A wishes to hold the speech, A effects the hold operation at the telephone set 2. A reason for holding may include a transfer to a third person (C). When A effects the hold operation, the private switcher or button telephone main control unit 1 receives a signal (holding signal) indicating an intention of holding from the information of the telephone set 2 (step S102). The private switcher or button telephone main control unit 1 stores the information of the telephone set 3 as a held telephone set (step S103) and disconnects a line between the telephone sets 2 and 3 (step S104). A holding tone is sent to the held telephone set (telephone set 3) (step S105). When the private switcher or button telephone main control unit 1 detects that the telephone set 3 has been hooked on while it was held (step S106), it stores that the held telephone set 3 which had previously been stored was hooked on (step S107) When the private switcher or button telephone main control unit 1 detects that A, who effected the holding operation, has effected an operation to transfer the speech with B to C (step S108), it searches for a transfer-to telephone set (step S109), checks if the transfer-to telephone set (telephone set 4) is busy or not (step S110), sends a calling signal to the telephone set 4 if it is not busy (step S111) and sends a calling tone to the transfer-from telephone set 2 (step S112). When the private switcher or button telephone main control unit 1 detects the off-hook of the transfer-to telephone set 4 (step S113), it stops the calling signal and the calling tone and establishes a speech line between the transfer-from telephone set 2 and the transfer-to telephone set 4 (step S114). Thus, the speech communication between A and C is permitted and A tells C that A wants to transfer the speech with B (step S115). Then, the telephone set 2 is hooked on. When the private switcher or button telephone main control unit 1 detects the on-hook of the telephone set 2 (step S116), it searches for the held telephone set (telephone set 3) from the memory (step S117), and if it detects that the telephone set 3 is on-hook (step S118), it sends a calling signal to the telephone set 3 (step S119) and sends a calling tone to the telephone set 4 (step S120). After it has detected the off-hook of the telephone set 3 (step S121), it stops sending the calling signal and the calling tone, establishes a communication line between the telephone sets 3 and 4 (step S122) to permit speech communication by B and C (step S123). This completes the transfer control procedure.

If the held telephone set 3 has been waiting without hooking on in the step S118, the holding tone to the telephone set 3 is stopped and the communication line between the telephone sets 3 and 4 is immediately established.

If the transfer-to telephone set is busy (step S110), a busy tone is sent to the transfer-from telephone set 2 to inform that the transfer is not accepted (step S130), and if A sends a hold-release signal through the telephone set 2 (step S131), a step S141 is carried out. Alternatively, the transfer-to telephone set 4 is called, and if the telephone set 2 sends a hold-release signal before the telephone set 4 is hooked off (step S140), the held telephone set is searched (step S141). If the on-hook of the held telephone set is detected (step S142), a calling signal is sent to the held telephone set (step S143) and a calling tone is sent to the telephone set 2 (step S144). When the held telephone set (telephone set 3) is hooked off (step S145), the calling signal and the calling tone are stopped and the communication line between the telephone sets 2 and 3 is established (step S146). Thus, speech communication between A and B is again permitted (step S147). In the step S142, if the held telephone set 3 has been waiting for the release without hooking on the handset, the step S146 is immediately carried out to stop the holding tone and establish the communication line between the telephone sets 2 and 3.

On the other hand, if the transfer is not carried out during the holding, the procedure is that shown in FIG. 2. If the hold-release signal is received before the held telephone set has been hooked on (step S150), the step S146 is immediately carried out to establish the communication line between the telephone sets 2 and 3.

The application of the present invention to the transfer operation with holding has been described. The present invention is also applicable to other service functions of the private switcher or button telephone system which accompany the holding such as three-person speech.

Figure 5:
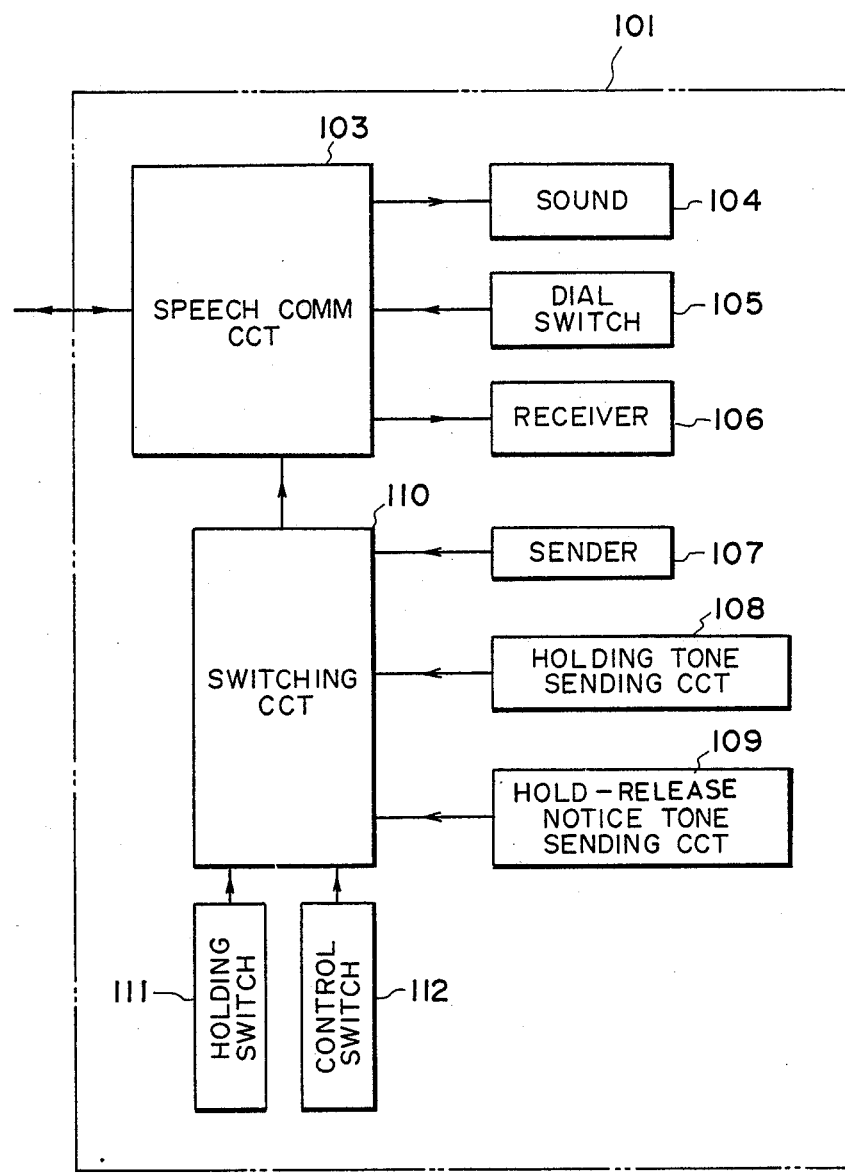
FIG. 5 shows a block diagram of a third embodiment.
Figure 6:
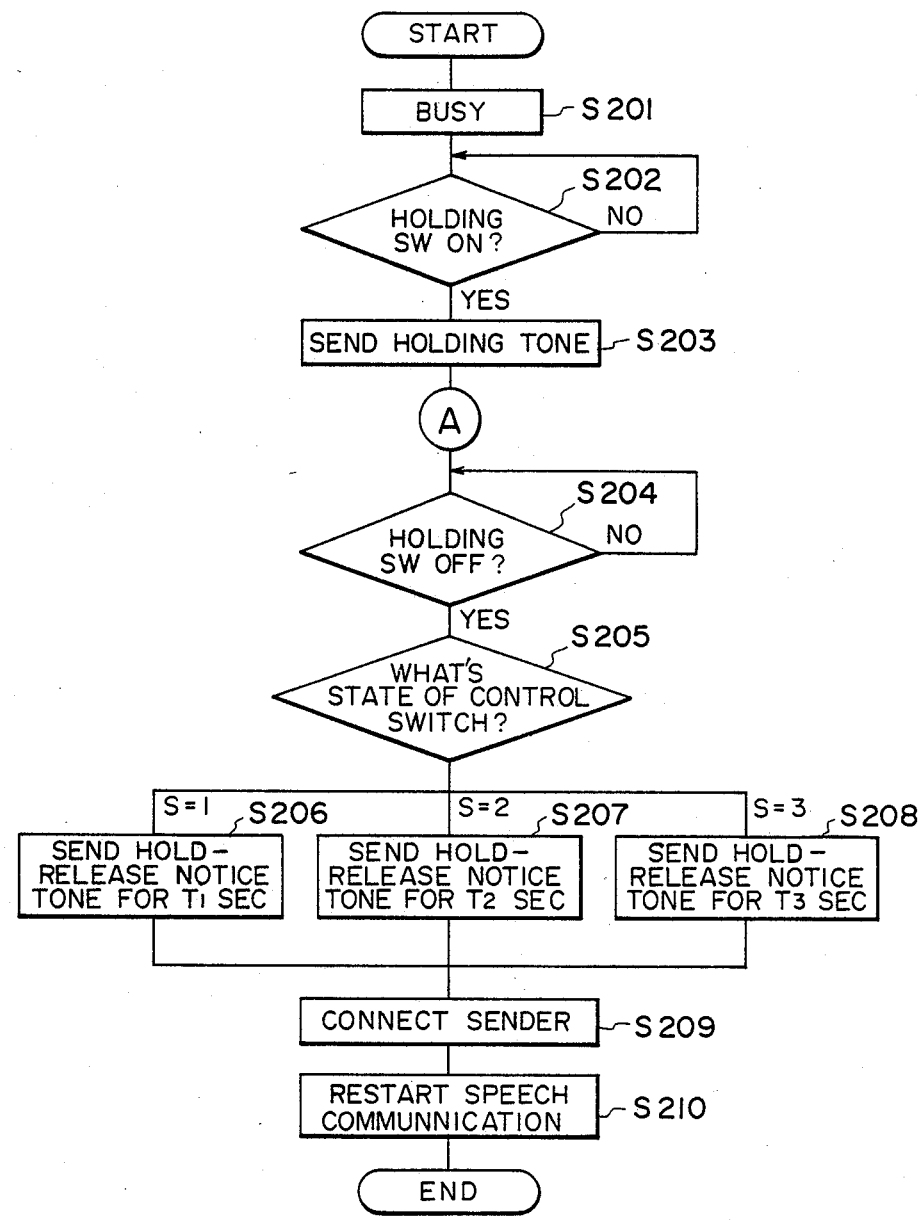
FIG. 6 shows a flow chart of the third embodiment.
Figure 7:
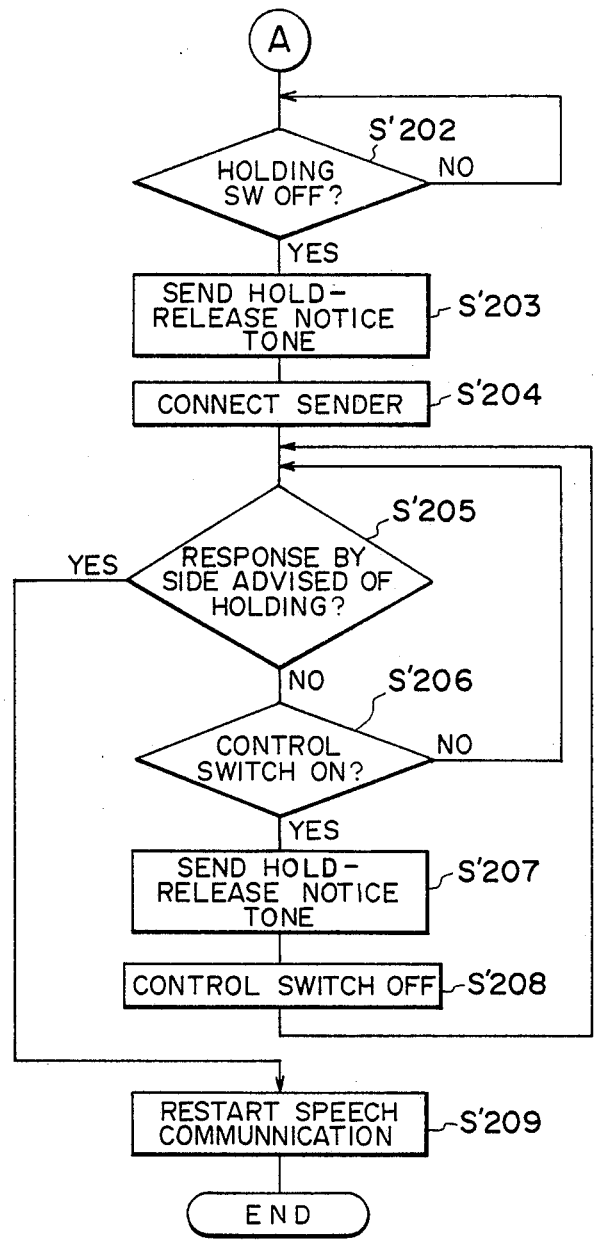
FIG. 7 shows a flow chart of a fourth embodiment.

FIGS. 5, 6 and 7 show third and fourth embodiments of the present invention.

FIG. 5 shows the third embodiment of the present invention. Numeral 101 denotes a telephone set with a holding function, numeral 102 denotes a line, numeral 103 denotes a speech communication circuit for realizing a basic speech communication function of the telephone set, numeral 104 denotes a sounder which is an electro-acoustic transducer for a tone ringer, numeral 105 denotes a dial switch, numeral 106 denotes a receiver, numeral 107 denotes a sender, numeral 108 denotes a holding tone sender for sending a holding tone to a held telephone set during a holding state, numeral 109 denotes a hold-release tone sender for sending an audible tone to inform that the holding has been released to the held telephone set, numeral 110 denotes a switching circuit for selectively connecting the sender 107, the holding tone sender 108 and the hold-release tone sender 109 to the line 102, numeral 111 denotes a hold switch, and numeral 112 denotes a control switch for controlling sending of the hold-release tone.

FIG. 6 shows a flow chart of an operation carried out when the telephone is held and then the holding is released. The operation of the third embodiment is explained with reference to the flow chart of FIG. 6.

When the switching circuit 110 detects the turn-on of the hold switch 111 (S114) during the control of speech (S113), the holding tone is sent from the holding tone sender 108 to the held telephone set (S115). When the holding is released, the hold-release tone which is large enough to allow an operator at the held telephone set to hear the tone even if he/she is away from the receiver 106 is sent. Accordingly, the operator at the held telephone set may engage in other jobs until he/she hears the hold-release tone. When the holding switch 111 at the holding telephone set is turned off, the release of the holding is detected (S116). The switching circuit 110 sends the hold-release tone from the hold-release tone sender 109 for Tn seconds to the line 102 through the speech communication circuit 103 in accordance with the state of a control switch 112 S=n (n=1, 2, 3) (S117–S120). Then, it connects the sender 107 to the speech communication circuit 103 (S121) to resume the speech communication (S122). In the present embodiment, the hold-release tone send time may be switched in three stages by the control switch 112. Thus, it is possible to send the hold-release tone for a relatively long time so that the operator at the held telephone set can recognize it. In FIG. 6, the selection of the control switch 112 is effective when the state which has been set before the hold switch 111 is turned off is released from the holding.

FIG. 7 shows a flow chart of an operation when the function of the control switch of FIG. 5 is changed The operation is explained with reference to FIG. 7.

The operation of the fourth embodiment is same as that of the previous embodiment until the sending of the holding tone (S115) in FIG. 6. FIG. 7 shows the steps after the step S115. When the hold switch 111 is turned off, the release of holding is detected (S116). The hold-release tone sender 109 sends the hold-release tone for a predetermined time to the line 102 through the speech communication circuit 103 (S123). Then, the sender 107 is connected to the speech communication circuit 103 (S121) to permit the speech communication. If the held telephone set is not hooked off (S124) in spite of the hold-release tone (S123), the state of the control switch 112 is checked (S125) If the turn-on of the control switch 112 is detected in the step S125, the hold-release tone is again sent (S123). The control switch 112 is returned to its off position immediately after it has been turned on (S126). The control switch 112 may be kept on until the held telephone set is hooked off (S124) so that the hold-release tone can be sent for a desired period (S125, S126).

When the held telephone set is hooked off, the speech communication is resumed (S124, S122).

In the present embodiment, the hold-release tone may be sent any number of times by turning on the control switch 112 while the sender is connected. Thus, even if the operator at the held telephone set fails to hear the hold-release tone sent immediately after the turn-off of the hold switch, the release of holding may be informed to the operator at the held telephone set by resending the hold-release tone.

As described above, when the held telephone set is hooked on, it is stored in the private switcher or button telephone main control unit, and when the holding is released, the calling signal is sent to the hooked-on held telephone set. If the held telephone set is hooked off in response thereto, the communication between the held telephone set and the hold-releasing telephone set is established. Accordingly, it is not necessary for the operator at the held telephone set to wait for the release of holding while he/she holds the handset and an efficiency of telephone switching is enhanced. The present invention is applicable not only to the holding but also to other service functions which accompany with the holding such as transfer and three-person communication.

The above embodiments are also applicable to any communication other than telephone communication which accompanys with the holding.

In accordance with the present invention, the communication holding status can be readily recognized by the operator.

The present invention is not limited to the above embodiments but various modifications thereof may be made.

The present invention is applicable to any communication control unit having a communication hold function.

We claim:
1. A communication apparatus comprising:
communication means for effecting communication;
hold means for holding a communication state with a communication partner;
release means for releasing the holding of communication by said hold means;
detect means for detecting break of line of the communication partner by said hold means;
means for calling the communication partner held by said hold means in accordance with the release by said release means and the detection by said detection means; and
means for generating a signal indicating the calling of the communication partner during calling of the communication partner by said calling means.

2. An apparatus according to claim 1, wherein said calling means generates a calling signal.

3. A communication control system comprising:
line connection means for controlling connection of a communication line between communication terminals;
hold detect means for detecting a hold notice from the communication terminals connected to the communication line by said line connection means;
hold means for holding the communication line in accordance with hold notice;
release detect means for detecting a hold-release notice from the communication terminal which has issued the hold notice;
break detect means for detecting line break of the held communication terminal;
means for calling the held communication terminal in accordance with hold-release notice and the line break detection; and
means for outputting to the communication terminal which has issued the hold notice a signal indicating the calling during calling of the held communication terminal.

4. A system according to claim 3, wherein said calling means generates a calling signal.

5. An apparatus according to claim 1, wherein said signal generating means generates an audible sound indicating the calling of the communication partner.

6. An apparatus according to claim 1, further comprising means for transferring the held communication to a different communication terminal.

7. A system according to claim 3, wherein said output means generates a sound signal indicating the calling.

8. A system according to claim 3, wherein said calling means calls the held communication terminal when the hold-release notice is detected and the line brake is detected.

9. A system according to claim 3, further comprising means for transferring the held communication to another terminal in accordance with an instruction from said communication terminal which has issued the hold notice.

* * * * *

UNITED STATES PATENT AND TRADEMARK OFFICE
CERTIFICATE OF CORRECTION

PATENT NO. : 4,870,680

DATED : September 26, 1989

INVENTOR(S) : KUNIAKI OHTSUKA ET AL.

It is certified that error appears in the above-identified patent and that said Letters Patent is hereby corrected as shown below:

Title Page:

AT [56] REFERENCES CITED

Attorney, Agent, or Firm,
        "CElla," should read --Cella,--.

COLUMN 2

Line 61, "(calling a" should read --(a calling--.

COLUMN 3

Line 14, "information" should be deleted.
    Line 15, "of" should be deleted.

UNITED STATES PATENT AND TRADEMARK OFFICE
CERTIFICATE OF CORRECTION

PATENT NO. : 4,870,680

DATED : September 26, 1989

INVENTOR(S) : KUNIAKI OHTSUKA ET AL.

It is certified that error appears in the above-identified patent and that said Letters Patent is hereby corrected as shown below:

COLUMN 6

Line 18, "detec-" should read --detect--.
    Line 19, "tion" should be deleted.
    Line 33, "hold notice;" should read --the hold notice;--.
    Line 40, "hold-release notice" should read --the hold-release notice--.
    Line 58, "line brake" should read --line break--.

Signed and Sealed this

Thirtieth Day of June, 1992

Attest:

DOUGLAS B. COMER

Attesting Officer      Acting Commissioner of Patents and Trademarks